United States Patent Office 3,591,394
Patented July 6, 1971

3,591,394
METHOD OF PRODUCTION OF INJECTION
MORTAR OR POROUS CONCRETE
Kurt Diggelmann, Zurich, and Robert Serena, Koniz,
Bern, Switzerland, assignors to Kaspar Winkler & Co.,
Inhaber Dr. F. A. Schenker-Winkler & Dr. R. Burkard-
Schenker, Zurich, Switzerland
No Drawing. Filed Feb. 27, 1968, Ser. No. 708,494
Claims priority, application Germany, Mar. 3, 1967,
W 43,482
Int. Cl. C04b 21/00, 13/26
U.S. Cl. 106—87                                    5 Claims

ABSTRACT OF THE DISCLOSURE

The method for producing injection mortar or porous concrete comprises adding to a cement containing mixture a nitrogen delivering compound in an amount of of 0.1% to 6% of the weight of the cement causing an expansion or formation of pores in said mixture. The nitrogen delivering compound preferably will be a hydrazine derivative, such as hydrazine sulfate or dihydrazine sulfate, or a benzene-sulfohydrazine, a stabilised diazonium salt, or a diazotized nitro-aniline, and an activator for the nitrogen delivering compound may be added.

The known methods for pressing-out of pre-stressed concrete ducts in pre-stressed concrete, as well as for stabilization of rock, soil or pervious concrete, are characterised in that by injecting, pressing-in or filling-in of cement/water mixtures or cement/sand/water mixtures all undesired cavities are completely and durably filled by expanding cement containing mortars of different composition, which, in the following are briefly designated as injection mortars.

The method for producing such injection mortars is based essentially on the fact that the composition, besides cement, water and possible aggregates, comprises addition agents containing gas delivering compositions. According to the dosage of such addition agents, the injection mortar can just compensate the shrinkage of the cement containing mixture or effect an expansion of such mixtures. With the hitherto usual gas delivering agents, such as e.g. powders of aluminum, potassium, magnesium or zinc, or carbides, etc. it had not been possible to produce homogeneous, uniformly acting injection mortars. The processing temperatures and the variations of the cement, on the one hand, and the usually required preliminary treatment of the metal powders and the handling of carbides, on the other hand, cause much too great irregularities in the processing technique. Besides, all gas delivering agents known heretofore resulted in too big gas pores and cracks in the set injection mortar, so that even minimum requirements to strength often appeared to be questionable, or these agents produced, besides the pore forming gas, corrosive by-products. The greatest draw-back of such gas delivering agents which have been used until now resulted from the fact that in the cement alkaline medium either hydrogen or ammonia were developed. The corroding action of these gases on e.g. tension steel or reinforcing irons is sufficiently known and extremely dangerous. The addition agents containing a gas delivering component should start to function when the injection mortar, after its production, is pumped or pressed through previously drilled holes or ducts to the place where it shall ultimately stay. The regulation of the gas delivery thereby becoming necessary could not be effected heretofore in a controllable manner. Likewise, it was difficult, with the methods used heretofore for the production of porous beton, to time the gas delivery in such manner that this latter is terminated after the production of the concrete. At variable mixing temperatures, particularly at low temperatures, the difficulty was experienced that gas delivery started too late and cracks were formed in the processed and already set concrete. Therefore, in certain cases, e.g. when producing freeze-proof concrete, until now the most different surface-active agents were hitherto used with the intention of air introducing agents. However, it is known that in this case quite different property values of the produced concrete bodies are obtained. The amount of air introduced in this manner is quite variable according to the choice of the aggregate and the vibration times, principally the resulting distribution of pores often is bad, i.e. the strength of test specimens from one and the same finished concrete structure are very variable according to the place of origin of the specimen.

The method of producing injection mortar or porous concrete according to the present invention comprises adding to a cement containing mixture at least one nitrogen delivering compound which produces an expansion of the injection material or a formation of pores in the concrete material. It is known that nitrogen delivering compounds are used in the plastics industry e.g. as expanding agents for rubber products, but there the operating temperatures are above 100° C. in order to obtain the nitrogen delivery. The nitrogen delivery of the agents used in the method according to the present invention is possible in the cement-alkaline medium at all temperatures at which the cement can normally set. The kind of the cement used is not of primary importance. Activators such as e.g. aluminates and copper salts are used, which have a decomposing action on the agents used according to the invention and containing at least one nitrogen-nitrogen bond. Organic as well as inorganic compounds are suitable, preferably azo- and hydrazine compounds. The nitrogen delivering compounds can be used advantageously as a mixture with further additions such as lignin sulfonates, albumen-decomposition products, hydroxy- or polyhydroxy-carboxylic acids and their derivatives, with activators for gas delivery and with fillers, such as stone powder, quartz powder, bentonite, infusorial earth or chalk. The efficiency of the method according to the invention is improved with respect to the methods in which treated metals, for example passivated aluminum are used, since a time consuming, expensive and hardly controllable working process for the production of the addition agent will become superfluous. Also, according to the invention there is no formation of hydrogen. A mixture suitable as a cement addition contains for example sodium aluminate, soda, calciumhydroxide, calciumcarbonate as filler, copper sulfate, an alginate concentrating agent, lignin sulfonate and a hydrazide, such as diphenylsulfon-3,3'-disulfohydrazide and/or benzene-sulfohydrazide.

The invention is explained still more in detail with reference to examples which will be described later. The classification of the various mortar and concrete mixes is effected according to the usual rules of the building trade. All examples had been based on a cement mortar of the following composition:

|  | Kg. |
|---|---|
| Portland cement | 2.000 |
| Water | 0.780 |
| Additive | 0.004 |

By means of a flow according to Rilem-standard the flow times were measured after a mixing time of four minutes. The values obtained correspond to the mean values of three flow times. Subsequently cylindric plastics boxes having a diameter of 10 cm. were filled to a height of 10 cm. with the cement mortar, and by means of a depth gauge the level of the mortar was measured at six points. The mean value of these measurements was ascertained immediately after the filling into the boxes, and after three, six and twenty-four hours. Simultaneously with the measurements for determination of expansion and or shrinkage of the mortar, each time the amount of water settled on the surface (bleeding) was determined. This was effected with a graduated measuring pipette. For ascertaining the compression strengths of the injection mortar cubic test specimens of a size 10 x 10 x 10 cm. were produced and so stored at 100% relative moisture and at 20° C. until the test date, that the expansion could be considered as impeded, as this is the case for sheath tubes with prestressing cables.

In order to illustrate the efficiency of the additives according to the invention, test specimens were produced for each example at a mixing temperature of 20° C.

The zero test contains water and cement at a weight ratio 39:100 without further additives. The indicated percentages by weight refer always to the weight of the cement, when no other indications are given.

EXAMPLE 1

To the mixture of the zero test were added 2 percent by weight of an additive which contains two percent by weight of aluminum powder as a gas delivering component and four percent by weight of lignin sulfonate as a plasticizing means. The measuring values obtained serve to characterise one of the hitherto usual methods for the production of injection mortar.

EXAMPLE 2

Two percent by weight of an additive were added to the mixture of the zero test, said additive containing three percent by weight of benzene-sulfohydrazide and one percent by weight of methyl cellulose as a water retaining component. Besides, five percent by weight of a basic activator twenty percent of which consist of potassium copper tellurate had been added to the additive.

EXAMPLE 3

Instead of potassium copper tellurate, nine percent by weight of copper sulfate and five percent by weight of sodium aluminate were used. For the remainder the composition corresponds to that described in Example 2.

EXAMPLE 4

The benzene sulfohydrazide and potassium copper tellurate used in Example 2 were replaced by 2 percent by weight of dihydrazine-sulfate and 20 percent by weight of copper sulfate. For the remainder the composition corresponds to the mixture as described in Example 2.

EXAMPLE 5

In this example benzene sulfohydrazine was added as nitrogen delivering compound at a dosage of 0.05 percent by weight. Lead peroxide at a dosage of 0.068 percent by weight was used as activator. Besides, 0.05 percent by weight of an alginic acid ester was added to the mixture as a water retaining component.

EXAMPLE 6

Instead of lead peroxide used in the Example 5, potassium persulfate was used at a concentration of 0.08 percent by weight. For the remainder the composition corresponds to the mixture as described in Example 2.

EXAMPLE 7

To a concrete mix of 10 kg. portland cement, 30 kg. aggregate (greatest grain size 3 mm.) and 5 kg. water, two hundred grams of an additive containing 3 percent by weight of benzene sulfohydrazine, 3 percent by weight of sodium perborate and 3 percent by weight of lignin sulfonate as active component were added.

EXAMPLE 8

In this example the additive contained 30 percent by weight of p-nitro benzene diazonium salt of the naphtalene disulfonicacid-(1.5) and 7.5 percent by weight of iron-II gluconate. Besides, the composition corresponds to the mixture as described in Example 6.

TABLE 1

| Mixtures | Water/cement factor | Temperature of mixture in degree Celsius | Flow time through standard funnel in sec. | Separation of water in percent by volume after— | | | | Modification of volume of mortar in percent, increase=+ and decrease=— after— | | | |
|---|---|---|---|---|---|---|---|---|---|---|---|
| | | | | 1 hr. | 3 hrs. | 7 hrs. | 24 hrs. | 1 hr. | 3 hrs. | 7 hrs. | 24 hrs. |
| Zero test | 0.39 | 20 | Standstill | 1 | 3 | 2.5 | 2 | −2.3 | −3.8 | −3.6 | −3.5 |
| Example: | | | | | | | | | | | |
| 1 | 0.39 | 20 | 17.5 | 1.5 | 2 | 4.5 | 4 | +0.5 | +0.8 | +1.8 | +2.6 |
| 2 | 0.39 | 20 | 18.0 | 0 | 0 | 0 | 0 | 0.2 | +1.0 | +2.6 | +4.3 |
| 3 | 0.40 | 20 | 15.4 | 0 | 0 | 0 | 0 | +0.6 | +1.3 | +3.4 | +4.7 |
| 4 | 0.40 | 20 | 16.6 | 0 | 0 | 0 | 0 | +2.0 | +3.3 | +3.5 | +3.5 |
| 5 | 0.40 | 20 | 15.6 | 0 | 0 | 0 | 0 | +2.6 | +4.5 | +5.2 | +5.5 |
| 6 | 0.40 | 20 | 16.6 | 0 | 0 | 0 | 0 | +5.3 | +5.5 | +5.8 | +6.0 |

TABLE 2

Compression strength of cube after 7 and 28 days, stored at 100% humidity, 20° C. (kg./cm.$^2$)

| Mixtures | 7 days | 28 days |
|---|---|---|
| Zero test | | 414 |
| Example: | | |
| 1 | 211 | 294 |
| 2 | | 354 |
| 3 | 247 | 352 |
| 4 | 253 | 364 |
| 5 | 258 | 341 |
| 6 | 413 | 302 |

TABLE 3

| Concrete mixtures | Properties of fresh concrete | | | Compression strength in kg./cm.$^2$ after— | |
|---|---|---|---|---|---|
| | Water/cement factor | Unit weight, kg./l. | Air in percent | 7 days | 28 days |
| Zero test | 0.5 | 2.23 | 2.3 | 390 | 435 |
| Example: | | | | | |
| 7 | 0.5 | 2.21 | 5.8 | 322 | 361 |
| 8 | 0.5 | 2.20 | 6.0 | 311 | 354 |

What is claimed is:

1. A method of producing injection mortar or porous concrete, which comprises adding to a portland cement mortar containing mixture at least one nitrogen-delivering compound selected from the group consisting of a hydrazine derivative and a diazonium compound, and an activator for said nitrogen-delivering compound, said activator being able to chemically cleave off nitrogen from the hydrazine derivative or diazonium compound, said nitrogen-delivering compound being present in an amount from 0.01% to 0.6% of the weight of the cement, and thereby causing an expansion of the injection material or a formation of pores in the concrete material.

2. A method according to claim 1 wherein said nitrogen-delivering compound is selected from the group consisting of dihydrazine-sulfate, benzene-sulfohydrazine and a salt of a diazotized nitroaniline.

3. A method according to claim 1 wherein said activator is selected from the group consisting of sodium aluminate, potassium copper tellurate, potassium persulfate, lead peroxide, sodium perborate and iron-II gluconate.

4. A method according to claim 3 wherein said activator is added in an amount of 0.01% to 0.5% of the weight of the cement.

5. A method according to claim 1 wherein the nitrogen-delivering compound is used together with plasticizing components selected from the group consisting of ligninsulfonates, protein decomposition products, hydroxy- or polyhydroxy carbon acids and their derivatives, said plasticizer components being added in an amount of 0.01% of the weight of the cement.

References Cited

UNITED STATES PATENTS

| | | | |
|---|---|---|---|
| 3,374,188 | 3/1968 | Marsh et al. | 106—122 |
| 3,306,862 | 2/1967 | Mageli et al. | 106—122 |
| 2,898,220 | 8/1959 | Ulfstedt et al. | 106—87 |
| 2,371,928 | 7/1943 | Schneider | 106—87 |
| 2,191,555 | 2/1940 | Berliner | 106—87 |
| 2,163,207 | 6/1939 | Missotten | 106—87 |

OTHER REFERENCES

Lea & Desch, "The Chemistry of Cement and Concrete," Edu. Arnold & Sons, pp. 506–7 (1956).

Cotton and Wilkinson, "Advanced Inorganic Chemistry," Interscience Publishers, 2nd Ed., pp. 335–7 (1966).

TOBIS E. LEVOW, Primary Examiner

W. T. SCOTT, Assistant Examiner

U.S. Cl. X.R.

106—90, 314